(12) United States Patent
Wang et al.

(10) Patent No.: US 11,379,653 B2
(45) Date of Patent: Jul. 5, 2022

(54) RENDERING METHOD FOR ON-DEMAND LOADING OF PDF FILE ON NETWORK

(71) Applicant: FUJIAN FOXIT SOFTWARE DEVELOPMENT JOINT STOCK CO., LTD., Fuzhou (CN)

(72) Inventors: Yadong Wang, Fuzhou (CN); Junyi Liang, Fuzhou (CN)

(73) Assignee: FUJIAN FOXIT SOFTWARE DEVELOPMENT JOINT STOCK CO., Fujian Province (CN)

( * ) Notice: Subject to any disclaimer, the term of this patent is extended or adjusted under 35 U.S.C. 154(b) by 0 days.

(21) Appl. No.: 17/417,347

(22) PCT Filed: Jul. 18, 2019

(86) PCT No.: PCT/CN2019/000144
§ 371 (c)(1),
(2) Date: Jun. 22, 2021

(87) PCT Pub. No.: WO2020/124687
PCT Pub. Date: Jun. 25, 2020

(65) Prior Publication Data
US 2022/0075928 A1 Mar. 10, 2022

(30) Foreign Application Priority Data

Dec. 20, 2018 (CN) .......................... 201811563391.2

(51) Int. Cl.
*G06F 40/14* (2020.01)
*H04L 67/02* (2022.01)
*H04L 67/60* (2022.01)

(52) U.S. Cl.
CPC .............. *G06F 40/14* (2020.01); *H04L 67/02* (2013.01); *H04L 67/32* (2013.01)

(58) Field of Classification Search
None
See application file for complete search history.

(56) References Cited

U.S. PATENT DOCUMENTS

| 7,720,991 B1 * | 5/2010 | Parent | ................... | G06F 40/117 709/236 |
| 2003/0097462 A1 * | 5/2003 | Parent | ................... | G06F 40/117 707/E17.118 |

(Continued)

FOREIGN PATENT DOCUMENTS

| CN | 104750851 | 7/2015 |
| CN | 106599296 | 4/2017 |

(Continued)

OTHER PUBLICATIONS

International Search Report filed in PCT/CN2019/000144 dated Oct. 24, 2019.

*Primary Examiner* — Maikhanh Nguyen
(74) *Attorney, Agent, or Firm* — Rankin, Hill & Clark LLP

(57) ABSTRACT

The present disclosure provides a method for rendering a PDF file by on-demand loading the PDF file in a network. The method comprises the following steps: acquiring basic data information of a PDF file to be rendered by a user; and according to the basic data information, determining page data block information required for rendering and displaying a corresponding page of the PDF file, wherein the page data block information comprises a quantity, a position, and a size of at least one page data block in the corresponding page; sending a request comprising the page data block information to a server, and receiving each page data block corresponding to the request; and rendering the each page data block corresponding to the request to display the corresponding page, according to the basic data information of the PDF file.

2 Claims, 1 Drawing Sheet

(56) References Cited

U.S. PATENT DOCUMENTS

2003/0167271 A1\* 9/2003 Arnold ................ G06F 40/151
2008/0231885 A1\* 9/2008 Truong ................ G06F 3/122
　　　　　　　　　　　　　　　　　　　　　　　358/1.15
2010/0053705 A1\* 3/2010 Huang ................ G06T 11/60
　　　　　　　　　　　　　　　　　　　　　　　358/487

FOREIGN PATENT DOCUMENTS

| CN | 107451296 | 12/2017 |
| CN | 108804660 | 11/2018 |

\* cited by examiner

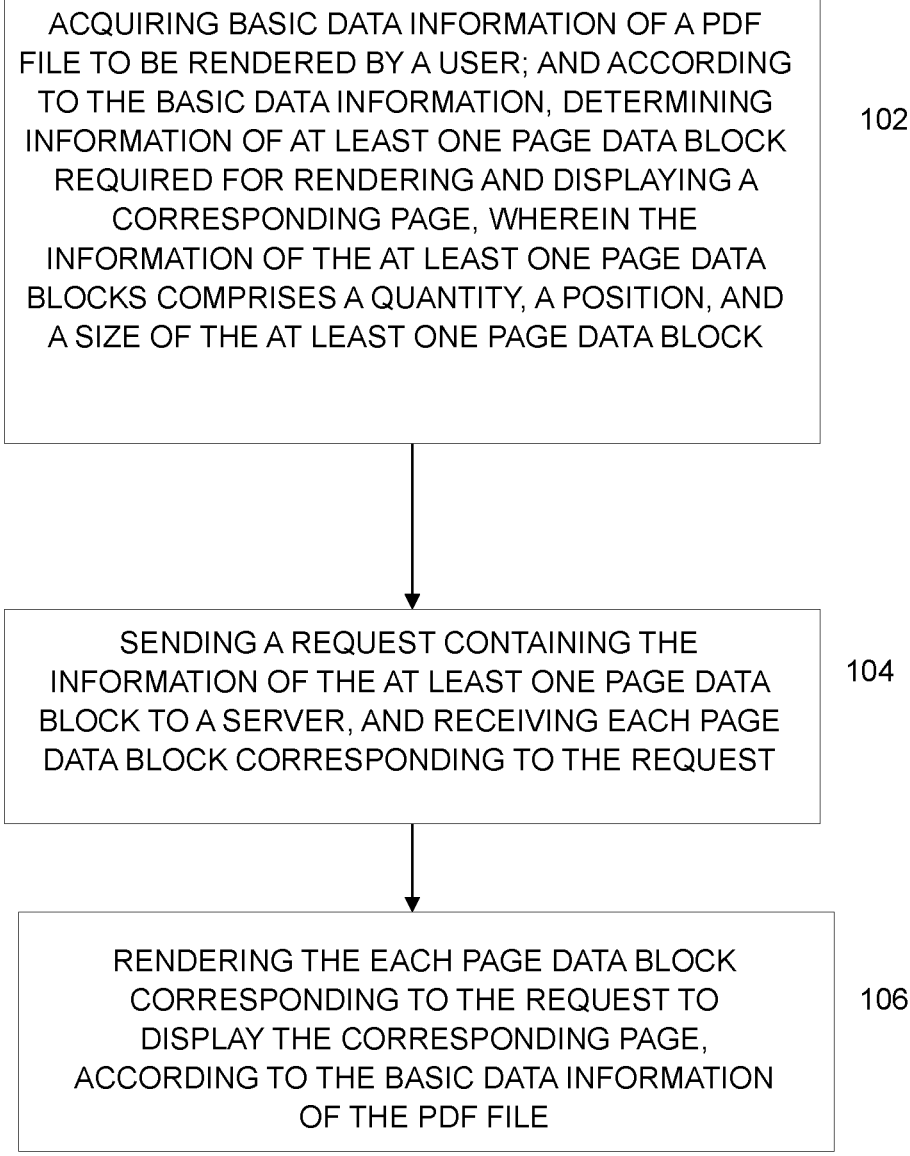

RENDERING METHOD FOR ON-DEMAND LOADING OF PDF FILE ON NETWORK

TECHNICAL FIELD

The present disclosure relates to a technical field of file processing, in particular to a method for parsing a PDF file and rendering a requested page just by using a small amount of file data of all file data of the PDF file.

BACKGROUND

Generally, if it is necessary to request a PDF file in a network and to browse the PDF file locally, all data of the entire PDF file locally has to be downloaded before rendering and displaying the PDF file. If the requested PDF file has a large amount of data, it is very time-consuming during requesting in a network. And the user has to wait for a long time, resulting in a relatively poor experience.

SUMMARY

In order to solve technical defects in the prior art an embodiment of the present disclosure provide a method, a device, a computing device and a storage medium for parsing a PDF file and determining information of page data blocks (comprising a quantity, a position, and a size of at least one page data block in the corresponding page) required for rendering the PDF file, and reading the PDF file block by block in a network.

In order to solve the above problems, the present disclosure provides a method for rendering a PDF file by on-demand loading the PDF file in a network. The method comprises the following steps:

acquiring basic data information of a PDF file to be rendered by a user; and according to the basic data information, determining page data block information required for rendering and displaying a corresponding page of the PDF file, wherein the page data block information comprises a quantity, a position, and a size of at least one page data block in the corresponding page;

sending a request comprising the page data block information to a server, and receiving each page data block corresponding to the request; and rendering the each page data block corresponding to the request to display the corresponding page, according to the basic data information of the PDF file.

Optionally, prior to the step of "sending the request comprising the page data block information to the server, and receiving each page data block corresponding to the request", the method further comprises a step:

creating a file storage area to store file data of the PDF file to be rendered.

The step of "sending a request comprising the page data block information to a server, and receiving each page data block corresponding to the request" comprises the following steps:

generating, according to information of each page data block comprising a quantity, a position and a size of the page data block, an HTTP segment request comprising the page data block information; and sending the HTTP segment request corresponding to the information of each page data block to the server, and receiving the page data block corresponding to the HTTP segment request.

Optionally, prior to the step of "sending the request comprising the page data block information to the server, and receiving each page data block corresponding to the request" and after the step of "creating a file storage area to store file data of the PDF file to be rendered", the method further comprises the following steps:

determining whether the at least one page data block corresponding to the page data block information is stored in the file storage area, and getting a determination result as YES or NO; and if the determination result is YES, directly calling the at least one page data block corresponding to the page data block information from the file storage area.

Optionally, the method further comprises a step:

if the determination result is NO, executing the step of "sending a request comprising the page data block information to a server, and receiving each page data block corresponding to the request".

In the method for rendering a PDF file by on-demand loading the PDF file in a network according to the embodiment of the present disclosure, an on-demand request for a large file can be realized, for example, a certain page of the PDF file could be rendered by downloading required data from the server only if the required data is not stored in the PDF file. Thereby the PDF file may be opened faster. In addition, since some resources in the PDF file are shared, the data of different pages may be repeatedly downloaded. In order to solve this problem, an additional caching mechanism is increased. The additional caching mechanism could ensure that all data is downloaded only once, without additional re-requests. Therefore, the method reduces the amount of downloaded data and improves a rendering experience.

BRIEF DESCRIPTION OF DRAWINGS

FIG. 1 illustrates a schematic flowchart of a method for rendering a PDF file by on-demand loading the PDF file in a network according to an embodiment of the present disclosure.

DETAILED DESCRIPTION

In the following description, many specific details are explained in order to fully understand the present disclosure. However, the present disclosure can be implemented in many other ways different from those described here, and those skilled in the art can make similar promotions without violating the connotation of the present disclosure. Therefore, the present disclosure is not limited by the specific embodiments disclosed below.

FIG. 1 illustrates a schematic flowchart of a method for reading a file from a network according to an embodiment of the present disclosure. As shown in FIG. 1, the method comprises step 102, step 104, and step 106.

In step 102, acquiring basic data information of a PDF file to be rendered by a user; and according to the basic data information, determining page data block information required for rendering and displaying a corresponding page of the PDF file, wherein the page data block information comprises a quantity, a position, and a size of at least one page data block in the corresponding page. For example, based on the basic data information such as an internal structure of the PDF file, we can know what data is needed for each page, where each data block is located in the PDF file, and the size of each data block. When all the data needed for a certain page is downloaded, this certain page can be rendered.

In step 104, sending a request comprising the page data block information to a server, and receiving each page data block corresponding to the request.

In an implementation, the step of "sending a request comprising the page data block information to a server, and receiving each page data block corresponding to the request" comprises the following steps:

generating, according to information of each page data block comprising a quantity, a position and a size of the page data block, an HTTP segment request comprising the page data block information; and sending the HTTP segment request corresponding to the information of each page data block to the server, and receiving the at least one page data block corresponding to the HTTP segment request.

For example, if we have calculated out that 0-100 bytes of data of a certain page of a PDF file are necessary to be acquired, a request for acquiring only 0-100 bytes from this certain page is sent; and if 200-500 bytes of data are further necessary to be acquired, a request for acquiring only 200-500 bytes from this certain page is sent, until all necessary data for this certain page is obtained, wherein all the necessary data is a minimum data for rendering the certain page.

In step 106, rendering the each page data block corresponding to the request to display the corresponding page, according to the basic data information of the PDF file.

In an implementation, the PDF file is a Portable Document Format document.

In an implementation, prior to the step of "sending the request comprising the page data block information to the server, and receiving each page data block corresponding to the request", the method further comprises a step: creating a file storage area to store file data of the PDF file to be rendered. For example, for the PDF file, a data area may be created, which corresponds to the data area of the entire PDF file. When a resource is requested, it is preferably to search the resource in the created data area at first. If the resource is absent in the created data area, it is necessary to download the resource from the original address and then place the resource in the data area after completing downloading. Alternatively, if the resource has been stored in the created data area, the resource can be used directly.

In an implementation, prior to the step of "sending the request comprising the page data block information to the server, and receiving each page data block corresponding to the request" and after the step of "creating a file storage area to store file data of the PDF file to be rendered", the method further comprises the following steps:

determining whether the at least one page data block corresponding to the page data block information is stored in the file storage area, and getting a determination result as YES or NO; and if the determination result is YES, directly calling the at least one page data block corresponding to the page data block information from the file storage area.

In an implementation, the method further comprises a step:

if the determination result is NO, executing the step of "sending a request comprising the page data block information to a server, and receiving each page data block corresponding to the request".

In the method for rendering a PDF file by on-demand loading the PDF file in a network according to the embodiment of the present disclosure, an on-demand request for a large file can be realized, for example, a certain page of the PDF file could be rendered by downloading required data from the server only if the required data is not stored in the PDF file. Thereby the PDF file may be opened faster. In addition, since some resources in the PDF file are shared, the data of different pages may be repeatedly downloaded. In order to solve this problem, an additional caching mechanism is increased. The additional caching mechanism could ensure that all data is downloaded only once, without additional re-requests. Therefore, the method reduces the amount of downloaded data and improves a rendering experience.

It should be noted that in order to simply describe an embodiment of the aforementioned methods, an embodiment are described as a series of combined actions. However, it should be understood by those skilled in the art that the present disclosure is not limited by described sequences of the actions. Therefore, some steps may be implemented in other sequences or simultaneously based on the present disclosure. In addition, it should be appreciated by those skilled in the art that: all embodiments described in the present disclosure belong to preferred embodiments, and those actions and modules involved therein are not necessarily essential to the present disclosure.

In the above-described embodiments, each embodiment of the present disclosure has its own focus, so portions has not been described in details in one embodiment can be referred to related descriptions of other embodiments.

The preferred embodiments of the present disclosure disclosed above are only used to help illustrate the present disclosure. The optional embodiment does not describe all the details, nor does it limit the present disclosure to only the described specific embodiments. Apparently, many modifications and changes can be made according to the content of the present disclosure. The present disclosure selects and specifically describes these embodiments in order to better illustrate the principles and practical applications of the present disclosure. Thereby, those skilled in the art can understand and utilize the present disclosure well. The description of the present disclosure is only limited by the claims and the full protection scope and equivalents thereof.

What is claimed is:

1. A method for rendering a Portable Document Format (PDF) file by on-demand loading the PDF file in a network, the method executed by a computer processor, comprising:

acquiring basic data information of a PDF file to be rendered by a user; and according to the basic data information, determining page data block information required for rendering and displaying a corresponding page of the PDF file, wherein the page data block information comprises a quantity, a position, and a size of at least one page data block in the corresponding page;

sending a request comprising the page data block information to a server, and receiving each page data block corresponding to the request; and rendering each page data block corresponding to the request to display the corresponding page, according to the basic data information of the PDF file, wherein sending the request comprising the page data block information to the server, and receiving each page data block corresponding to the request further comprises:

generating, according to information of each page data block comprising a quantity, a position and a size of the page data block, an HTTP segment request comprising the page data block information; and sending the HTTP segment request corresponding to the information of each page data block to the server, and receiving the page data block corresponding to the HTTP segment request, wherein the page data block information required for rendering is acquired by a portion of file data of all file data of the PDF file; and the PDF file is rendered without downloading the entire PDF file; and prior to sending the HTTP segment request corresponding to the information of each page data block to the server, and receiving each page data block corresponding to the HTTP segment request, the method further comprises: creating a file storage area to store file data of the PDF file to be rendered, wherein prior to sending the HTTP segment request corresponding to the information of each page data block to the server, and receiving each page data block corresponding to the HTTP segment request and after creating the file storage area to store file data of the PDF file to be rendered, the method further comprising:

determining whether the at least one page data block corresponding to the page data block information is stored in the file storage area, and getting a determination result as YES or NO; and if the determination result is YES, directly calling the at least one page data block corresponding to the page data block information from the file storage area, and if the determination result is NO, executing sending the HTTP segment request corresponding to the information of each page data block to the server, and receiving each page data block corresponding to the HTTP segment request.

2. The method according to claim 1, wherein the PDF file is a PDF document.

* * * * *